(12) United States Patent
Pinel et al.

(10) Patent No.: US 9,206,376 B2
(45) Date of Patent: Dec. 8, 2015

(54) GALLING-RESISTANT THREADED TUBULAR COMPONENT, AND PROCESS FOR COATING SAID COMPONENT

(75) Inventors: Eliette Pinel, Sainte-Euphemie (FR); Eric Gard, Genay (FR); Mikael Petit, Villefranche sur Saone (FR); Mohamed Gouider, Caluire et Cuire (FR)

(73) Assignees: VALLOUREC OIL AND GAS FRANCE, Aulnoye-Aymeries (FR); SUMITOMO METAL INDUSTRIES, Ltd., Osaka-shi (JP)

( * ) Notice: Subject to any disclaimer, the term of this patent is extended or adjusted under 35 U.S.C. 154(b) by 568 days.

(21) Appl. No.: 13/517,990

(22) PCT Filed: Dec. 10, 2010

(86) PCT No.: PCT/EP2010/007556
§ 371 (c)(1),
(2), (4) Date: Aug. 17, 2012

(87) PCT Pub. No.: WO2011/076350
PCT Pub. Date: Jun. 30, 2011

(65) Prior Publication Data
US 2012/0312527 A1   Dec. 13, 2012

(51) Int. Cl.
*B32B 1/08* (2006.01)
*C10M 169/04* (2006.01)
(Continued)

(52) U.S. Cl.
CPC .......... *C10M 169/04* (2013.01); *C08G 18/0823* (2013.01); *C08G 18/6279* (2013.01); *C08G 18/635* (2013.01); *C09D 175/04* (2013.01); *E21B 17/042* (2013.01); *F16L 15/004* (2013.01); *C10M 2201/05* (2013.01); *C10M 2201/102* (2013.01); *C10M 2205/14* (2013.01); *C10M 2213/003* (2013.01); *C10M 2213/023* (2013.01);
(Continued)

(58) Field of Classification Search
CPC .......... B32B 1/02; B32B 1/08; Y10T 428/13; Y10T 428/139; F16L 15/004; C10M 2201/05
USPC ................. 428/34.1, 34.2, 35.7, 35.9, 36.9
See application file for complete search history.

(56) References Cited

U.S. PATENT DOCUMENTS 4,782,130 A * 11/1988 Re et al. .......................... 528/70
5,180,509 A    1/1993 Jacobs
(Continued)

FOREIGN PATENT DOCUMENTS

EP      2 128 506        2/2009
FR      2914926 A  * 10/2008
(Continued)

OTHER PUBLICATIONS

French Patent No. 2914926 (English translation).*
(Continued)

*Primary Examiner* — Marc Patterson
(74) *Attorney, Agent, or Firm* — Oblon, McClelland, Maier & Neustadt, L.L.P.

(57) ABSTRACT

A galling-resistant threaded tubular component for drilling or operating hydrocarbon wells and a process for coating the component. The tubular component includes at one of its ends a threaded zone produced on its external or internal peripheral surface depending on whether the threaded end is male or female in type, at least a portion of the end being coated with a dry film including a fluorourethane matrix.

9 Claims, 3 Drawing Sheets

(51) Int. Cl.
  *E21B 17/042* (2006.01)
  *C08G 18/62* (2006.01)
  *C08G 18/63* (2006.01)
  *C08G 18/08* (2006.01)
  *C09D 175/04* (2006.01)
  *F16L 15/00* (2006.01)
  *B32B 1/02* (2006.01)

(52) U.S. Cl.
  CPC ..... *C10M 2213/043* (2013.01); *C10M 2215/04* (2013.01); *C10M 2215/14* (2013.01); *C10M 2219/046* (2013.01); *C10M 2229/02* (2013.01); *C10N 2250/12* (2013.01); *C10N 2280/00* (2013.01)

(56) References Cited

U.S. PATENT DOCUMENTS

| | | | |
|---|---|---|---|
| 6,846,779 | B1 | 1/2005 | Hinterwaldner et al. |
| 2005/0009711 | A1 | 1/2005 | Hinterwaldner et al. |
| 2009/0220780 | A1 | 9/2009 | Bordet et al. |
| 2010/0059986 | A1 | 3/2010 | Kimoto et al. |
| 2010/0201119 | A1 | 8/2010 | Bordet et al. |
| 2010/0301600 | A1 | 12/2010 | Goto et al. |

FOREIGN PATENT DOCUMENTS

| | | |
|---|---|---|
| JP | 06-262726 A | 9/1994 |
| JP | 08-13350 A | 1/1996 |
| JP | 2001-65753 A | 3/2001 |
| JP | 2002 348587 | 12/2002 |
| JP | 2003-21278 A | 1/2003 |
| JP | 2003-42354 A | 2/2003 |
| JP | 2003-242703 A | 8/2003 |
| JP | 2008-151133 A | 7/2008 |
| JP | 2008-525618 A | 7/2008 |
| JP | 2008-215473 A | 9/2008 |
| WO | 2009 072486 | 6/2009 |

OTHER PUBLICATIONS

U.S. Appl. No. 13/824,812, filed Mar. 18, 2013, Gard, et al.
International Search Report Issued Aug. 19, 2011 in PCT/EP10/007556 Filed Dec. 10, 2010.
U.S. Appl. No. 13/977,238, filed Sep. 4, 2013, Pinel, et al.
U.S. Appl. No. 13/700,744, filed Nov. 29, 2012, Gard, et al.
U.S. Appl. No. 14/427,370, filed Mar. 11, 2015, Gouider, et al.
U.S. Appl. No. 14/316,351, filed Jun. 26, 2014, Bordet, et al.
U.S. Appl. No. 13/884,717, filed May 10, 2013, Gard, et al.

* cited by examiner

GALLING-RESISTANT THREADED TUBULAR COMPONENT, AND PROCESS FOR COATING SAID COMPONENT

The present invention relates to a galling-resistant tubular component used for drilling and operating hydrocarbon wells, and more precisely to the threaded end of such a component, said end being male or female in type and capable of being connected to a corresponding end of another component to form a connection. The invention also relates to a threaded connection resulting from joining two tubular components by makeup. The invention also relates to a process for coating such a galling-resistant tubular component.

A component which is "used for drilling and operating hydrocarbon wells" means any element that is substantially tubular in form intended to be connected to another element of the same type or otherwise to finally constitute either a string for drilling a hydrocarbon well or a riser intended for maintenance, such as work-over risers, or for operation, such as production risers, or for a casing string or tubing string used in the operation of wells. The invention is also applicable to components used in a drill string, such as drill pipes, heavy weight drill pipes, drill collars and the portions of pipe connections and heavy weight pipes known as tool joints.

Each tubular component comprises one end provided with a male threaded zone and/or one end provided with a female threaded zone each intended to be connected by makeup with the corresponding end of another component, the assembly defining a connection.

Threaded tubular components are connected under defined stresses in order to satisfy the requirements for an interference fit and seal imposed by the service conditions. Depending on the types of alloys used for the connections, the stresses may vary in severity and nature. Carbon steel alloys are somewhat vulnerable as regards their corrosion behaviour in general, but in contrast have more favourable frictional properties. Stainless steel alloys, in contrast, exhibit more critical frictional behaviour but have very good corrosion resistance. In wells, the threaded tubular components may have to undergo several makeup-breakout cycles. Makeup operations are generally carried out under high axial load, for example the weight of a tube several metres in length to be connected by the threaded connection, which may be localized by a slight misalignment of the axis of the threaded elements to be connected; this induces a risk of galling at the threaded zones and at the metal/metal sealing surfaces.

Various solutions intended to protect the threaded zones have been implemented.

Traditionally, in order to protect the threaded zones against galling during makeup-breakout operations, they are stripped of grease which protects against corrosion and coated with special makeup grease such as grease in accordance with American Petroleum Institute standards API But 5A2 or 5A3. However, in addition to the disadvantage of requiring a supplementary coating operation to be carried out on-site, the use of such greases, loaded with heavy and/or toxic metals such as lead, suffers from the disadvantage of causing pollution of the wells and of the environment, since excess grease is ejected from the threadings during makeup.

In order to improve the retention of lubricants as well as the adhesion of coatings on carbon steels, phosphatation type treatments have been developed, such as zinc phosphatation, manganese phosphatation, or mixed phosphatation. Those treatments consist of a chemical attack of the steel, leading to the formation of a highly adhesive crystalline layer which provides enhanced protection against corrosion.

That type of surface treatment, however, suffers from the disadvantage of not being applicable to chromium steels. It also suffers from disadvantages on an industrial scale, in that it is difficult to control the technical parameters (possible homogeneity problems) and in that the effluents have to be treated in an expensive manner.

Oxalation type surface treatments, based on attack of the surface with oxalic acid, and used for steels, suffer from disadvantages in that environmental issues are more pronounced than those mentioned previously for phosphatation.

In order to improve the retention of lubricants and the adhesion of coatings to carbon steels, solutions employing the modification of surfaces by mechanical action, such as shot blasting, sand blasting and any other impact process have also been used. However, the performances observed are poor.

Other processes, such as sherardization and other derivative processes, use metallic diffusion. That type of process is industrially unwieldy and expensive and causes problems with the treatment of effluents because of the presence of zinc on the surface.

Further advances which satisfy more environmental standards have consisted in designing a product known as a "dry" lubrication product, which solves most of the problems linked to the use of API type greases. Thus, lubricants of the dry thermosetting sliding varnish type have provided a high performance, ecologically viable solution. This is particularly the case with epoxy-based resins comprising particles of solid lubricants.

Viscoplastic type systems have also been developed in order to achieve even better results.

However, dry thermosetting or viscoplastic sliding varnishes do not always offer sufficient galling resistance.

The invention proposes a solution falling into the category of dry sliding varnish type lubricants which are galling resistant.

More precisely, the invention concerns a galling-resistant threaded tubular component for drilling or operating hydrocarbon wells. Said tubular component has at one of its ends a threaded zone produced on its external or internal peripheral surface depending on whether the threaded end is male or female in type; at least a portion of the end is coated with a dry film comprising a fluorourethane matrix.

Optional characteristics, which are complementary or substitutional, are defined below.

The fluorourethane matrix is obtained by cross-linking fluoroethylenevinylether.

Particles of solid lubricants are dispersed in the matrix.

The particles of solid lubricants comprise particles of lubricants from at least two of classes 1, 2, 3 and 4.

An anticorrosion agent is integrated into the matrix.

A synthetic wax and/or an oil is (are) integrated into the matrix.

Additives are integrated into the matrix to reinforce the mechanical properties.

The entire threaded zone is coated with dry film.

A metal/metal sealing surface provided on the tubular component is coated with dry film.

The invention also concerns a threaded tubular connection comprising a male threaded tubular component and a female threaded tubular component made up one into the other. At least one of said threaded tubular components is as described above.

The invention also concerns a process for coating a galling-resistant threaded tubular component for drilling or operating hydrocarbon wells, said tubular component having at one of its ends a threaded zone produced on its external or internal peripheral surface depending on whether the threaded end is male or female in type. The process comprises the following steps:

obtaining a system comprising a cross-linkable fluoroethylenevinylether resin;

depositing the system on at least a portion of the threaded zone over a thickness of at least 20 microns;

cross-linking the fluoroethylenevinylether resin to a fluorourethane.

Optional features, which are complementary or substitutional, are defined below.

The system may be an aqueous or organic dispersion of cross-linkable fluoroethylenevinylether resin, preferably functionalized with carboxylic acid groups neutralized with a polymeric secondary amine.

The system may be an emulsion of cross-linkable fluoroethylenevinylether resin, preferably functionalized with ethylene oxide groups.

The system may be a cross-linkable fluoroethylenevinylether resin dissolved in an organic solvent.

The system may comprise a hardener, preferably of the aliphatic polyisocyanate type.

The system may comprise particles of solid lubricants.

Said particles of solid lubricants comprise particles of lubricants from at least two of classes 1, 2, 3 and 4.

The system may comprise an anticorrosion agent.

The system may comprise a synthetic wax and/or an oil.

The system may comprise reinforcing additives.

Deposition of the system comprising the fluoroethylenevinylether resin may be preceded by a step for surface preparation selected from the group constituted by sand blasting, phosphatation, and electrolytic deposition of Cu—Zn—Sn.

The features and advantages of the invention will be described in more detail in the description which follows, made with reference to the accompanying drawings.

Figure 1:
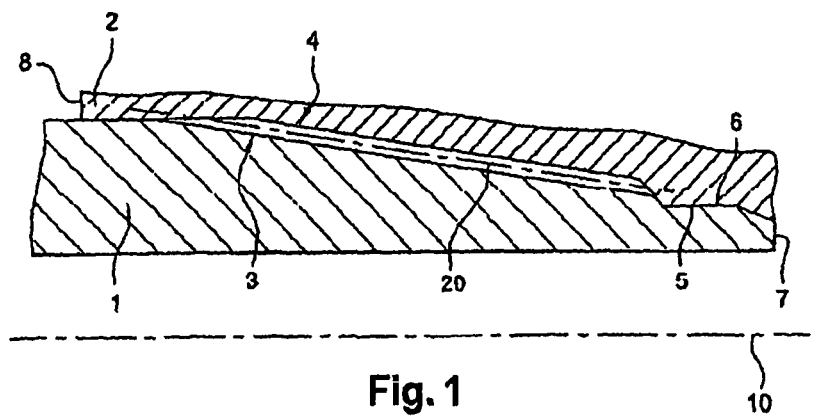
FIG. 1 is a diagrammatic view of a connection resulting from connecting two tubular components by makeup.

The threaded connection shown in FIG. 1 comprises a first tubular component with an axis of revolution 10 provided with a male end 1 and a second tubular component with an axis of revolution 10 provided with a female end 2. The two ends 1 and 2 finish respectively in a terminal surface 7, 8 which is orientated radially with respect to the axis 10 of the threaded connection and are respectively provided with threaded zones 3 and 4 which cooperate mutually for mutual connection by makeup of the two components. The threaded zones 3 and 4 are conventional in that they may be of the trapezoidal, self-locking, etc thread type. Furthermore, metal/metal sealing surfaces 5, 6 intended to come into tight interference contact against each other after connecting the two threaded components by makeup are provided between the threaded zones 3, 4 and the terminal surface 7 of the male end 1.

At least one of the threaded tubular components is coated on at least a portion of one of the ends 1, 2 with a dry film comprising a fluorourethane matrix. This fluorourethane matrix is obtained by cross-linking fluoroethylenevinylether (FEVE), said FEVE forming part of the fluoropolymer family. The use of certain fluoropolymers as a coating on a wide variety of substrates has been known since the 1930s. They are characterized by excellent chemical and heat resistance and also by excellent wear resistance. These coatings are not tacky to the touch and they also have advantageous anticorrosion properties. They include in particular PVDF (polyvinylidene fluoride), PTFE, PFE (copolymer of tetrafluoroethylene and hexafluoroethylene) and PFA (perfluoroalkyl vinyl ether copolymer). However, their use is limited because the solvents have to be used at high temperature (>200° C.) in order to form a film which, in the end, offers only a low surface energy and thus as a consequence a low adhesivity as regards metals.

In contrast, the Applicant has obtained superior tribological performances under hostile environmental conditions by using matrices of fluoroethylenevinylether resins, these matrices having a coefficient of friction of 1.1 or fewer times the coefficient of friction of PTFE (itself in the range 0.05 to 0.2). Highly conclusive tests have been notably carried out on films with a cross-linkable fluoroethylenevinylether matrix, resulting in the production of a fluorourethane.

Figure 3:
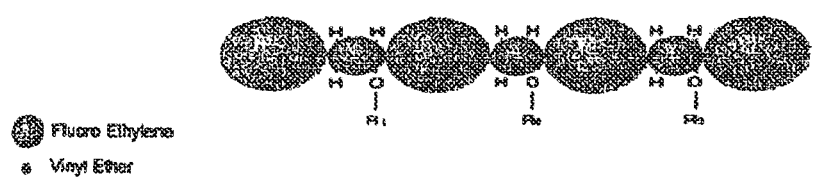
FIG. 3 is a chemical composition relating to the invention.

As can be seen in FIG. 3, the fluoroethylenevinylether (FEVE) used by the Applicant is a cross-linkable alternating copolymer principally intended to replace polyvinylidene fluorides (PVDF), in particular to dispense with the use of a solvent in particular in architectural coatings such as marine paint, for example, and "coil coating".

The chemical structure is particularly reinforced for the properties which are desirable here. The fluoroethylene monomer contributes to reinforcing the stability of the fluoropolymer by providing weatherproofing properties (especially as regards humid and corrosive conditions, and UV), as well as hardness and chemical resistance properties. Because of its nature, the fluorine atom of the monomer can simultaneously reduce the diffusion of water or chloride ions and reduce the ionization potential, which enables to obtain a better resistance to acids and alkalis and which enables to limit the formation of free radicals. Thus, better resistance to solvents and to UV is obtained.

The properties provided by the vinyl ether monomers are a function of the R1, R2 and R3 alkyl groups present. The characteristics of the alkyl groups are transparency, gloss and hardness of the fluoropolymer for R1, flexibility of the fluoropolymer for R2 and adhesion for R3 or the hydroxyl (—OH) function.

It should be noted that R3 is the site for cross-linking and solubility of the fluoropolymer in water and in organic solvents.

In accordance with one implementation, the dry film is obtained using a process comprising the following steps:
  obtaining an aqueous dispersion comprising a cross-linkable fluoroethylenevinylether resin;
  depositing the system on at least a portion of the threaded zone 3 or 4 over a thickness of at least 20 microns;
  cross-linking the fluoroethylenevinylether resin with a hydrophilic polyfunctional isocyanate type hardener of the HDI type, melamine type, to obtain a fluorourethane.

Dispersion in water is ensured by the vinyl ether groups. A portion of these groups are functionalized by carboxylic acid following the reaction of a dibasic acid anhydride on the terminal hydroxyl group. These acid functions are then neutralized by a polymeric secondary amine. The fluoroethylenevinylether resin may, for example, be LUMIFLON FD916 or FD1000 sold by AGC Chemicals. The resulting carboxylic acid salt is readily dispersible in demineralized water.

This aqueous dispersion may be cross-linked at ambient temperature (minimum 5° C.) and at high temperature (maximum 230° C.) using a hardener such as a water-dispersible aliphatic polyisocyanate to form a fluorourethane type dry coating. BAYHYDUR 3100 sold by BAYER may be used, for example.

The quantity of hardener necessary for optimized cross-linking is determined for a NCO/OH ratio of very slightly less than 1 in the final coating, i.e. for 100 g of LUMIFLON FD916 in dispersion, between 10 g and 14.7 g of BAYHYDUR 3100 is required.

The physico-chemical characteristics of an aqueous dispersion of LUMIFLON FD916 are shown in the table below:

| Physico-chemical characteristics | Values |
| --- | --- |
| Appearance | White milky liquid |
| Solids content (wt %) | 40% ± 2% |
| pH | 7-9 |
| Particle size (diameter) | 50-300 nm |
| Minimum film formation temperature | 27° C. |
| Acid index (mg KOH/g of polymer) | 15 |
| Hydroxyl index (mg KOH/g of polymer) | 85 |

Advantageously, a silicone surfactant of a modified polydimethylsiloxane polyether type may be added to the FEVE matrix to improve wetting of the support. Adding a coalescence agent with a low rate of evaporation of the dipropylene glycol n-butyl ether type in an amount in the range 2.5% to 10% by mass of the dry extract of the Lumiflon FD916 and more preferably in the range 2.5% to 5% by mass can be envisaged in order to facilitate coalescence by external plastification of the polymeric entities, to reduce the film formation temperature and to modify the surface tension of the dispersion medium in order to facilitate spreading.

Advantageously, a synthetic wax and/or an oil may be added to the FEVE matrix in order to improve the film-forming ability, and to reduce friction. The waxes may be in aqueous dispersion and the oils may be in the form of an emulsion.

The mixture of FEVE and hardener, for which the storage period in air and at ambient temperature (25° C.) does not exceed 4 hours, may be applied using a pneumatic gun spraying system. The temperatures of the mixture and the surface to be coated should preferably be close, and preferably in the range 20° C. to 30° C.

Advantageously, pre-drying at the application temperature for a period of 5 minutes is also recommended before drying for 10 minutes with a gradual rise in temperature from the application temperature to 80° C. Final drying or curing may be carried out at 120° C. for 15 minutes.

The chemical structure of the fluorourethane coating after cross-linking, and more particularly thermo cross-linking, of the FEVE system is as follows:

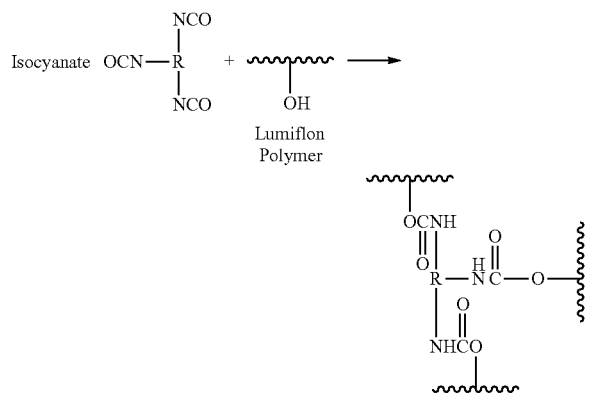

The thickness of the dry fluorourethane film is in the range 30 to 60 microns.

Highly satisfactory tests on the adhesion of a dry fluorourethane film were carried out on specimens of carbon steel which had been pre-coated with an electrolytic Cu—Sn—Zn deposit as well as on carbon steel specimens which had already received a conventional zinc phosphatation treatment. It should be noted that the surface preparation by electrolytic Cu—Sn—Zn deposition was in accordance with the disclosure in patent application WO-2008/108263, herein incorporated by reference.

Figure 4:
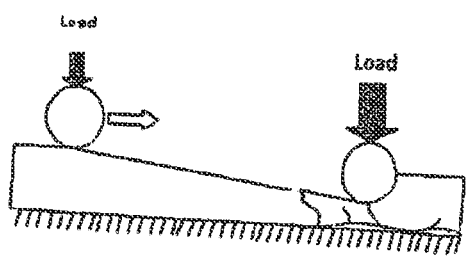
FIG. 4 is a diagrammatic view of a test set-up.

More specifically, tests were carried out in accordance using the Scratch test shown diagrammatically in FIG. 4. This test was derived from the Bowden test and allowed the adhesive force or adhesion of a coating on a surface or surface preparation to be determined. The method, consisting of shearing and deforming a coating with a spherical bead subjected to an increasing load, also allowed two major tribological parameters to be determined, namely the coefficient of friction and the critical load corresponding to the appearance of a loss of film cohesion.

The experimental conditions employed a spherical indenter formed from Inconel 718 with a diameter of 5 mm and a metal specimen as described above, as well as the following parameters: an increasing load from 10 N to 310 N (at a rate of 15 N/s), a bead displacement rate of 2 mm/s, a period of 20 s and a track length of 40 mm. The measured coefficient of friction is small and in the range $\mu=0.05$ for a load of 5 N and $\mu=0.09$ for a load of 80 N; in particular, a $\mu$ of 0.06 was measured for a load of 80 N on a surface preparation of the electrolytic Cu—Sn—Zn deposit type. Further, the friction of the fluorourethane coating is considered to be very stable regardless of the applied load. Thus, for increasing contact pressures from 250 to 1.1 GPa (contact pressures determined taking the Young's modulus for the surface preparation and that of the coating for small loads into account), a constant friction value is obtained, which means that the conclusion can be drawn that a threaded zone which is stressed in a non-uniform manner will respond in a uniform manner in terms of friction. This performance means in particular that relatively low values for the shouldering torque can be achieved for connections using films with a fluorourethane matrix.

The films with a fluorourethane matrix also have a particularly low coefficient of friction ($\mu=0.07$) for high contact pressures of the order of 2.5 GPa in contrast to an epoxy coating and regardless of the surface preparation. Films with a fluorourethane matrix limit the probability of a metal-metal contact during friction regardless of the stress.

The critical load was also determined using the Scratch test; the results are shown in the table below:

| Product name | Chemical nature | Specimen A* (%) | Specimen A** (%) | Specimen B* (%) | Specimen B** (%) |
|---|---|---|---|---|---|
| LUMIFLON FD916 | FEVE | 88 | 88 | — | — |
| BAYHYDUR 3100 | Aliphatic polyisocyanate HDI | 12 | 12 | — | — |
| EPOTUF 37-143 | Bisphenol-A diglycidyl ether | — | — | 50 | 50 |
| EPOTUF 37-685 | Modified diamine | — | — | 50 | 50 |
| Scratch test | Critical load: Lc(N): | >310 | >310 | >310 | >310 |

*carbon steel specimen with electrolytic Cu—Sn—Zn deposit
**carbon steel specimen with zinc phosphatation.

The films with a fluorourethane matrix exhibit excellent adhesion on carbon steel regardless of the nature of the surface preparation (polar or apolar), regardless of the roughness (Rz=10 μm for a zinc phosphatation, Rz=3 μm for the electrolytic Cu—Sn—Zn deposit), and regardless of the porosity, at least over a wide range.

This polyvalency of adhesion compared with that of an epoxy coating strengthens the advantage of the present invention.

Figure 2:
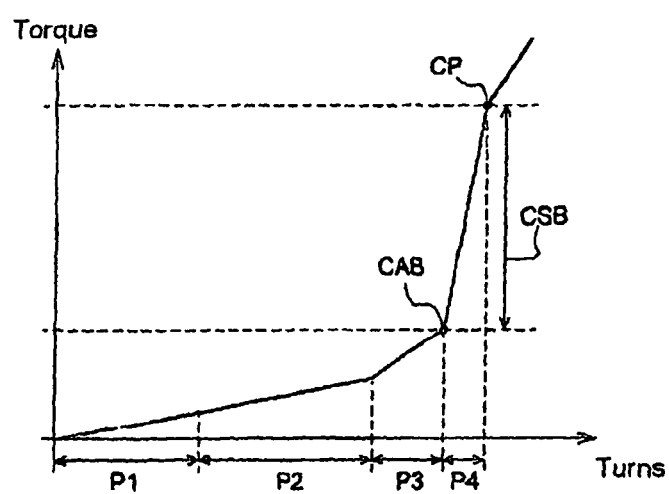
FIG. 2 is a diagrammatic view of a makeup curve for two threaded tubular components.

Regarding the tribological results concerning films, the Applicant wished to evaluate the behaviour of films with a fluorourethane matrix during a makeup operation for "premium" connections. More precisely, the torque on shoulder resistance CSB, also ToSR, was simulated and evaluated. This torque arises during makeup operations for premium connections used in the oil industry and represented in FIG. 2. The curve in FIG. 2 expresses the makeup torque (or tightening) as a function of the number of rotational turns made.

As can be seen, a profile for the makeup torque of "premium" connections can be broken down into four portions. In a first portion P1, the external threads of the male threaded element (or pin) of a first component of a threaded tubular connection as yet have no radial tightening with the internal threads of the corresponding female threaded element (or box) of a second component of the same threaded tubular connection.

In a second portion P2, the geometrical interference of the threads of the male and female threaded elements generates a radial tightening which increases as makeup continues (generating a small but increasing makeup torque).

In a third portion P3, a sealing surface at the external periphery of the end portion of the male threaded element interferes radially with a corresponding sealing surface of the female threaded element to produce a metal/metal seal.

In a fourth portion P4, the front end surface of the male threaded element is in axial abutment with the annular surface of a makeup abutment of the female threaded element. This fourth portion P4 corresponds to the terminal phase of makeup. The makeup torque CAB which corresponds to the end of the third portion P3 and to the start of the fourth portion P4 is termed the shouldering torque. The makeup torque CP which corresponds to the end of the fourth portion P4 is termed the plastification torque.

Beyond this plastification torque CP, it is assumed that the male makeup abutment (end portion of the male threaded element) and/or the female makeup abutment (zone located behind the annular abutment surface of the female threaded element) is subjected to plastic deformation, which may degrade performance as regards the tightness of the contact between the sealing surfaces by plastification of the sealing surfaces as well. The difference between the values for the plastification torque CP and the shouldering torque CAB is termed the torque on shoulder resistance CSB (CSB=CP−CAB).

A threaded tubular connection is subjected to optimized tightening at the end of makeup, which is a gauge of the optimized mechanical resistance of the threaded connection, for example to tensile forces but also to accidental breakout during service, and of optimized sealing performance. The designer of a threaded connection thus has to define, for a given type of threaded connection, a value for the optimized makeup torque which must, for all connections of this type of connection, be lower than the plastification torque CP (in order to avoid plastification of the abutments and the concomitant disadvantages) and higher than the shouldering torque CAB.

Ending makeup with a torque less than CAB cannot guarantee correct relative positioning of the male and female elements and thus of an effective seal between their sealing surfaces. Furthermore, there is a risk of breakout. The effective value of the shouldering torque CAB fluctuates greatly from one connection to another for the same type of connection as it depends on the diametric and axial machining tolerances of the male and female sealing surface(s); the optimized makeup torque should be substantially higher than the shouldering torque CAB. As a consequence, the higher the value of the torque on shoulder resistance CSB, the larger the margin for defining the optimized makeup torque, and the more the threaded connection will be resistant to operational stresses.

Friction tests were carried out using a Bridgman type machine. This type of machine has in particular been described in the article by D Kuhlmann-Wilsdorf et al, "Plastic flow between Bridgman anvils under high pressures", J Mater Res, vol 6, no 12, December 1991.

Figure 5:
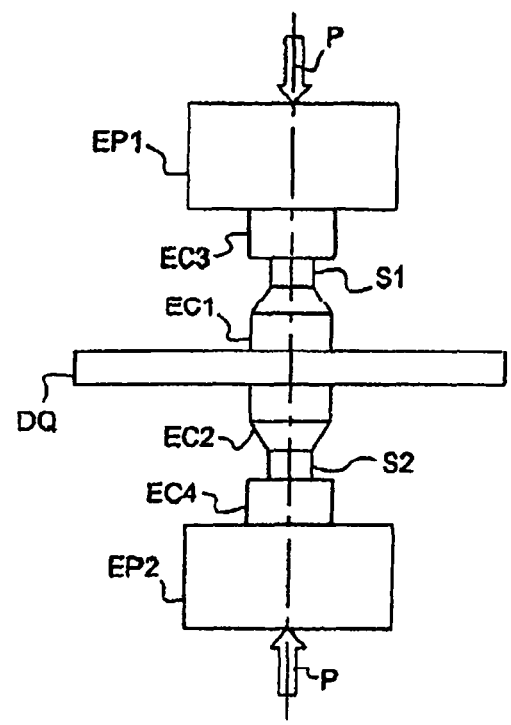
FIG. 5 is a diagrammatic view of another test set-up.

A diagrammatic and functional example of a Bridgman machine is illustrated in FIG. 5. This machine comprises:
- a disk DQ which can be driven in rotation at selected speeds;
- a first anvil EC1, preferably conical in type, permanently attached to a first face of the disk DQ;
- a second anvil EC2, preferably conical in type, permanently attached to a second face of the disk DQ, opposite its first face;
- first EP1 and second EP2 pressure elements, such as pistons, for example, which can exert the selected axial pressures P;
- a third anvil EC3, preferably cylindrical in type, which is permanently attached to one face of the first pressure element EP1;
- a fourth anvil EC4, preferably cylindrical in type, which is permanently attached to one face of the second pressure element EP2.

To test a lubricant composition, two pieces of a material identical to that constituting a threaded element are covered with said composition in order to form the first S1 and second S2 specimens. Next, the first specimen S1 is interposed between the free faces of the first EC1 and third EC3 anvils, and the second specimen S2 between the free faces of the second EC2 and fourth EC4 anvils. Next, the disk DQ is rotated at a selected speed while applying a selected axial pressure P (for example of the order of 1.5 GPa) with each of the first EP1 and second EP2 pressure elements, and the makeup torque to which each specimen S1, S2 is subjected is measured.

The axial pressure, the rotation speed and the angle of rotation are selected in the Bridgman test in order to simulate the Hertz pressure and the relative speed of the abutment surfaces at the end of makeup.

Using such a machine, it is possible to fix several different pairings of parameters (makeup torque, rotation speed) in order to impose predetermined makeup torques on specimens S1 and S2, and thus to check whether these specimens S1 and S2 closely follow a given makeup torque profile, and in particular whether they enable to reach a number of completed turns before galling which is at least equal to a threshold value selected with respect to the selected makeup torques.

In the present case the selected contact pressure was 500 MPa and the rotation speed was 10 rpm. The test specimens were formed from stainless steel with 13% Cr, machined then coated with different formulations of dry coatings, listed in the table below along with the determination of the shouldering torque (CSB or ToSR).

| Product name | Chemical nature | Specimen A (%) | Specimen B (%) | Specimen C (%) |
|---|---|---|---|---|
| LUMIFLON FD916 | FEVE | 88 | — | — |
| BAYHYDUR 3100 | Aliphatic polyisocyanate HDI | 12 | — | — |

-continued

| Product name | Chemical nature | Specimen A (%) | Specimen B (%) | Specimen C (%) |
|---|---|---|---|---|
| EPOTUF 37-143 | Bisphenol-A diglycidyl ether | — | 50 | — |
| EPOTUF 37-685 | Modified diamine | — | 50 | — |
| Araldite (adhesive from BOSTIK) | Two-component epoxy | — | — | 100 |
| Bridgman ToSR | ToSR | 232% | 232% | 155% |

The value of the shouldering torque for the films with a fluorourethane matrix is much higher than the reference value of 100% for API 5A3 grease. It is also comparable with that of Araldite or hardened epoxy resin.

It is advantageously possible to improve the resistance properties as regards corrosion of films with a fluorourethane matrix using corrosion inhibitors integrated into the FEVE matrix. More precisely, the resistance properties as regards climatic conditions for the films with a fluorourethane matrix were studied through the anticorrosion protection offered by the coating using a saline mist test. The anticorrosion protection was tested for a film with a fluorourethane matrix with and without corrosion inhibiter pigments. This involved determining the barrier effect of the fluorourethane coating and also of defining the best compatibilities between the pigmentary or non-pigmentary corrosion inhibitors and the fluorourethane.

The corrosion inhibitors studied were: zinc calcium strontium orthophosphosilicate, calcium phosphosilicate, calcium borosilicate, lamellar zinc, fatty acid-amine complex, sol-gel hybrid.

The tables below concern the evaluation of a carbon steel surface with an electrolytic Cu—Sn—Zn deposit coated with a film with a fluorourethane matrix charged with various corrosion inhibitors.

| Product name | Chemical nature | Specimen A (%) | Specimen B (%) | Specimen C (%) | Specimen D (%) | Specimen E (%) |
|---|---|---|---|---|---|---|
| LUMIFLON FD916 | FEVE | 88 | 81 | 85 | 85 | 83 |
| BAYHYDUR 3100 | Aliphatic polyisocyanate HDI | 12 | 11 | 11.5 | 11.5 | 11 |
| Arcot 785 | Overalkalinized calcium sulphonate and calcinate | — | 8 | — | — | — |
| Halox 570 | Complex fatty acid amine | — | — | 3.5 | — | — |
| Halox SZP391 | Strontium zinc calcium orthophosphosilicate | — | — | — | — | 6 |
| Saline mist (ISO 9227) | Appearance of corrosion following exposure (hours): | 168 | 132 | 264 | 504 | >1008 |

| Product name | Chemical nature | Specimen A (%) | Specimen F (%) | Specimen G (%) | Specimen H (%) |
|---|---|---|---|---|---|
| LUMIFLON FD916 | FEVE | 88 | 82.5 | 86.5 | 87 |
| BAYHYDUR 3100 | Aliphatic polyisocyanate HDI | 12 | 11 | 12 | 12 |
| Halox CW 491 | Calcium phosphosilicate | — | 6.5 | — | — |
| Halox550WF | Sol-gel hybrid (silicone ester based) | — | — | 1.5 | — |
| GTT flakes | Lamellar zinc | — | — | — | 1 |
| Saline mist (ISO 9227) | Appearance of corrosion following exposure (hours): | 168 | >1008 | 384 | 216 |

The anticorrosion protection of films with a fluorourethane matrix is considerably improved by using corrosion-inhibiting pigments of the strontium zinc calcium orthophosphosiliate and calcium phosphosilicate type to obtain a surface corrosion resistance of more than 1000 hours in accordance with ISO standard 9227 with neither rust spots nor blistering nor detachment.

At the same time, the water resistance was evaluated using an immersion test (carbon steel specimen with zinc phosphatation coated with a film with a fluorourethane matrix) in demineralized water at 40° C. for 168 hours. The results demonstrated excellent water resistance when said coating was reinforced with an aqueous dispersion of paraffin wax sold by MICROPOWDERS under the trade name AQUA-BEAD 325E. The quantity of aqueous paraffin wax dispersion added was in the range 3% to 5% by mass with respect to the dry extract of the aqueous dispersion of LUMIFLON FD916. It should be noted that adding paraffin wax in a concentration of 5% dry extract with respect to the Lumiflon FD916 significantly improves the frictional resistance to wear with or without solid lubricant type pigmentary charges, i.e. $\mu$=0.06 as opposed to 0.08-0.1.

Similarly, it is possible to integrate solid lubricants into the FEVE matrix. The term "solid lubricant" as used here means a solid and stable body which, on being interposed between two frictional surfaces, enable to reduce the coefficient of friction and reduce wear and damage to the surfaces. These bodies can be classified into different categories defined by their functional mechanism and their structure, namely:

class 1: solid bodies owing their lubricant properties to their crystalline structure, for example graphite, zinc oxide (ZnO) or boron nitride (BN);

class 2: solid bodies owing their lubricant properties to their crystalline structure and also to a reactive chemical element in their composition, for example molybdenum disulphide $MoS_2$, graphite fluoride, tin sulphides, bismuth sulphides, tungsten disulphide, or calcium fluoride;

class 3: solid bodies owing their lubricant properties to their chemical reactivity, for example certain chemical compounds of the thiosulphate type, or Desilube 888 sold by Desilube Technologies Inc;

class 4: solid bodies owing their lubricant properties to a plastic or viscoplastic behaviour under frictional stress, for example polytetrafluoroethylene (PTFE) or polyamides.

The particular category of fullerenes should also be noted; they fall into a sub-category of class 1. It will be recalled that fullerenes are molecules with a spherical or tubular shape, with a monolayer or multilayered structure, with friction-reducing properties and properties of generating stable transfer films on the frictional surfaces. In particular, for example, it is possible to use carbon fullerenes or metallic disulphide type fullerenes.

It is also possible to recommend the combined use of at least two solid lubricants belonging to different classes, which means that synergistic effects can thus be obtained, thereby producing very high lubrication performances.

Advantageously, additives may be integrated into the FEVE matrix to reinforce the mechanical properties, such as titanium nitrides or carbides, or mineral nanometric particles (alumina, silica), in order to increase the frictional resistance of the mineral layer by adjusting the coefficient of friction.

Other coating processes integrating a system based on a fluoroethylenevinylether resin may also be employed. The system may, for example, consist of a cross-linkable fluoroethylenevinylether resin emulsion, preferably functionalized with ethylene oxide groups. The system may also consist of a cross-linkable fluoroethylenevinylether resin dissolved in an organic solvent, such as aromatic hydrocarbons, ketones, carbonates, etc.

The application of films with a fluorourethane matrix not only concerns the threaded zones of connections used in the exploration or operation of hydrocarbon wells, but also the sealing zones of said connections. In fact, these zones are often subject to high Hertz stresses because of interference (the diameter of the male tubular component is slightly greater than the diameter of the female tubular component in the interference zones in order to create sealed surfaces) and as a result are also prone to galling.

In conclusion, films with a fluorourethane matrix based on cross-linking functionalized fluoroethylenevinylether resins exhibit remarkable performances as regards friction, as they are equivalent to or even superior to those of an epoxy coating. The associated process based on an aqueous cross-linkable dispersion of fluoroethylenevinylether resins has the advantage of being simpler to carry out than the processes associated with bi-component or multilayer coatings.

Similarly, films with a fluorourethane matrix combine, in a single lubricating layer, the properties of hardness of a thermosetting coating and the properties of a lubricant which is deformable under high stress such as PTFE without the disadvantages of a multilayer application.

Similarly, the performance of films with a fluorourethane matrix can be compared with conventional solutions used in the field of "tefloning" without the disadvantages of the release of low boiling point solvents or the use of an excessive curing temperature, nor those with a limited mechanical hold.

The invention claimed is:

1. A galling-resistant threaded tubular component for drilling or operating hydrocarbon wells, the tubular component comprising:
at one of its ends a threaded zone produced on its external or internal peripheral surface depending on whether the threaded end is male or female in type, wherein at least a portion of the end is coated with a dry film comprising a fluorourethane matrix,
wherein the fluorourethane matrix is obtained by cross-linking fluoroethylene vinylether.

2. A galling-resistant threaded tubular component according to claim 1, wherein particles of solid lubricants are dispersed in the matrix.

3. A galling-resistant threaded tubular component according to claim 2, wherein particles of solid lubricants comprise particles of lubricants from at least two of classes 1, 2, 3 and 4.

4. A galling-resistant threaded tubular component according to claim 1, wherein an anticorrosion agent is integrated into the matrix.

5. A galling-resistant threaded tubular component according to claim 1, wherein a synthetic wax and/or an oil is integrated into the matrix.

6. A galling-resistant threaded tubular component according to claim 1, wherein additives are integrated into the matrix to reinforce mechanical properties.

7. A galling-resistant threaded tubular component according to claim 1, wherein an entire of the threaded zone is coated with the dry film.

8. A galling-resistant threaded tubular component according to claim 1, further comprising a metal/metal sealing surface, the sealing surface being coated with the dry film.

9. A threaded tubular connection comprising:
a male threaded tubular component and a female threaded tubular component configured to be connected to each other, wherein at least one of the threaded tubular components is a tubular component according to claim 1.

* * * * *

UNITED STATES PATENT AND TRADEMARK OFFICE
CERTIFICATE OF CORRECTION

PATENT NO. : 9,206,376 B2  
APPLICATION NO. : 13/517990  
DATED : December 8, 2015  
INVENTOR(S) : Eliette Pinel et al.

Page 1 of 1

It is certified that error appears in the above-identified patent and that said Letters Patent is hereby corrected as shown below:

Title page, add:
-- (30) Foreign Application Priority Data
Dec. 23, 2009   (FR) ....................09/06320 --

Signed and Sealed this
Twenty-sixth Day of July, 2016

Michelle K. Lee
*Director of the United States Patent and Trademark Office*